(12) United States Patent
Pattekar et al.

(10) Patent No.: US 11,806,926 B2
(45) Date of Patent: *Nov. 7, 2023

(54) APPARATUS FOR CONTINUOUS HIGH-SPEED 3D PRINTING

(71) Applicants: Xerox Corporation, Norwalk, CT (US); Palo Alto Research Center Incorporated, Palo Alto, CA (US)

(72) Inventors: Ashish V. Pattekar, Cupertino, CA (US); Warren Jackson, San Francisco, CA (US); Anne Plochowietz, Palo Alto, CA (US); Jengping Lu, Fremont, CA (US); Jamie Kalb, Mountain View, CA (US); Christopher L. Chua, San Jose, CA (US); Carolyn Moorlag, Mississauga (CA); Eugene Beh, Menlo Park, CA (US)

(73) Assignee: Xerox Corporation, Norwalk, CT (US)

( * ) Notice: Subject to any disclaimer, the term of this patent is extended or adjusted under 35 U.S.C. 154(b) by 41 days.

This patent is subject to a terminal disclaimer.

(21) Appl. No.: 17/568,641

(22) Filed: Jan. 4, 2022

(65) Prior Publication Data
US 2022/0126509 A1     Apr. 28, 2022

Related U.S. Application Data

(63) Continuation of application No. 16/237,464, filed on Dec. 31, 2018, now Pat. No. 11,279,084.

(51) Int. Cl.
*B29C 41/42* (2006.01)
*B29C 41/52* (2006.01)
(Continued)

(52) U.S. Cl.
CPC .......... *B29C 64/171* (2017.08); *B29C 41/085* (2013.01); *B29C 64/112* (2017.08);
(Continued)

(58) Field of Classification Search
CPC .......... B29C 2033/0005; B29C 41/085; B29C 41/42; B29C 41/52; B29C 64/171;
(Continued)

(56) References Cited

U.S. PATENT DOCUMENTS 4,961,154 A      10/1990 Pomerantz et al.
2017/0113417 A1*  4/2017 Deotte ................. B29C 64/124
(Continued)

FOREIGN PATENT DOCUMENTS

WO    2011011818 A1    2/2011
WO    2014095208 A1    6/2014
(Continued)

OTHER PUBLICATIONS

Extended European Search Report dated Jun. 29, 2020 for European Patent Application No. 19219928.9.

*Primary Examiner* — Leo B Tentoni
(74) *Attorney, Agent, or Firm* — Womble Bond Dickinson (US) LLP

(57) ABSTRACT

A printing system for producing at least one three dimensional (3D) printed part is described. The printing system includes a deposition system configured to continuously deposit a layer onto a cylinder to outwardly extend a diameter of the cylinder, wherein the layer comprises a first pattern. The printing system also includes a rotating system configured to rotate the cylinder, and a control system configured to synchronize the deposition system with the cylinder.

20 Claims, 10 Drawing Sheets

(51) Int. Cl.

| | | |
|---|---|---|
| *B29C 64/182* | (2017.01) | |
| *B29C 64/264* | (2017.01) | |
| *B29C 64/295* | (2017.01) | |
| *B29C 64/343* | (2017.01) | |
| *B29C 71/02* | (2006.01) | |
| *B29C 71/04* | (2006.01) | |
| *B33Y 30/00* | (2015.01) | |
| *B33Y 50/00* | (2015.01) | |
| *B33Y 50/02* | (2015.01) | |
| *B29C 64/171* | (2017.01) | |
| *B29C 64/194* | (2017.01) | |
| *B29C 64/112* | (2017.01) | |
| *B29C 64/209* | (2017.01) | |
| *B29C 64/35* | (2017.01) | |
| *B29C 64/268* | (2017.01) | |
| *B29C 64/241* | (2017.01) | |
| *B29C 64/386* | (2017.01) | |
| *B29C 64/393* | (2017.01) | |
| *B29C 64/40* | (2017.01) | |
| *B29C 64/245* | (2017.01) | |
| *B29C 41/08* | (2006.01) | |
| *B33Y 10/00* | (2015.01) | |
| *B33Y 40/00* | (2020.01) | |
| *B29C 33/00* | (2006.01) | |

(52) U.S. Cl.
CPC .......... *B29C 64/194* (2017.08); *B29C 64/209* (2017.08); *B29C 64/241* (2017.08); *B29C 64/245* (2017.08); *B29C 64/268* (2017.08); *B29C 64/35* (2017.08); *B29C 64/386* (2017.08); *B29C 64/393* (2017.08); *B29C 64/40* (2017.08); *B29C 2033/0005* (2013.01); *B33Y 10/00* (2014.12); *B33Y 30/00* (2014.12); *B33Y 40/00* (2014.12)

(58) Field of Classification Search
CPC ... B29C 64/182; B29C 64/209; B29C 64/241; B29C 64/245; B29C 64/264; B29C 64/295; B29C 64/343; B29C 64/386; B29C 64/393; B29C 64/40; B29C 71/02; B29C 71/04; B33Y 30/00; B33Y 50/00; B33Y 50/02
USPC ...... 425/135, 145, 174.4, 223, 375, 404, 445
See application file for complete search history.

(56) References Cited

U.S. PATENT DOCUMENTS

2018/0296343 A1* 10/2018 Wei ................. B33Y 50/00
2019/0022937 A1   1/2019 Stelter et al.

FOREIGN PATENT DOCUMENTS

WO    2017017622 A1    2/2017
WO    2017117380 A1    7/2017

* cited by examiner

APPARATUS FOR CONTINUOUS HIGH-SPEED 3D PRINTING

RELATED APPLICATIONS

This application is a continuation of U.S. patent application Ser. No. 16/237,464, filed on Dec. 31, 2018, now U.S. Pat. No. 11,279,084, issued on Mar. 22, 2022, which is herein incorporated by reference in its entirety.

TECHNICAL FIELD

This application relates to three dimensional (3D) printing or Additive Manufacturing (AM) systems and, in particular, to systems and methods for continuous high-speed 3D printing or Additive Manufacturing.

BACKGROUND

Three dimensional printing (3DP)/Additive Manufacturing (AM) technologies may typically rely on a layer-by-layer additive approach, in which a part (e.g., a workpiece) with the desired three dimensional (3D) geometry is created by repeatedly developing 2D patterns (e.g., in the form of individual layers typically less than ~100-500 micrometers thick) that are successively (sequentially) added on top of each-other.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the examples, implementations, and embodiments described here.

DETAILED DESCRIPTION

Figure 1A:
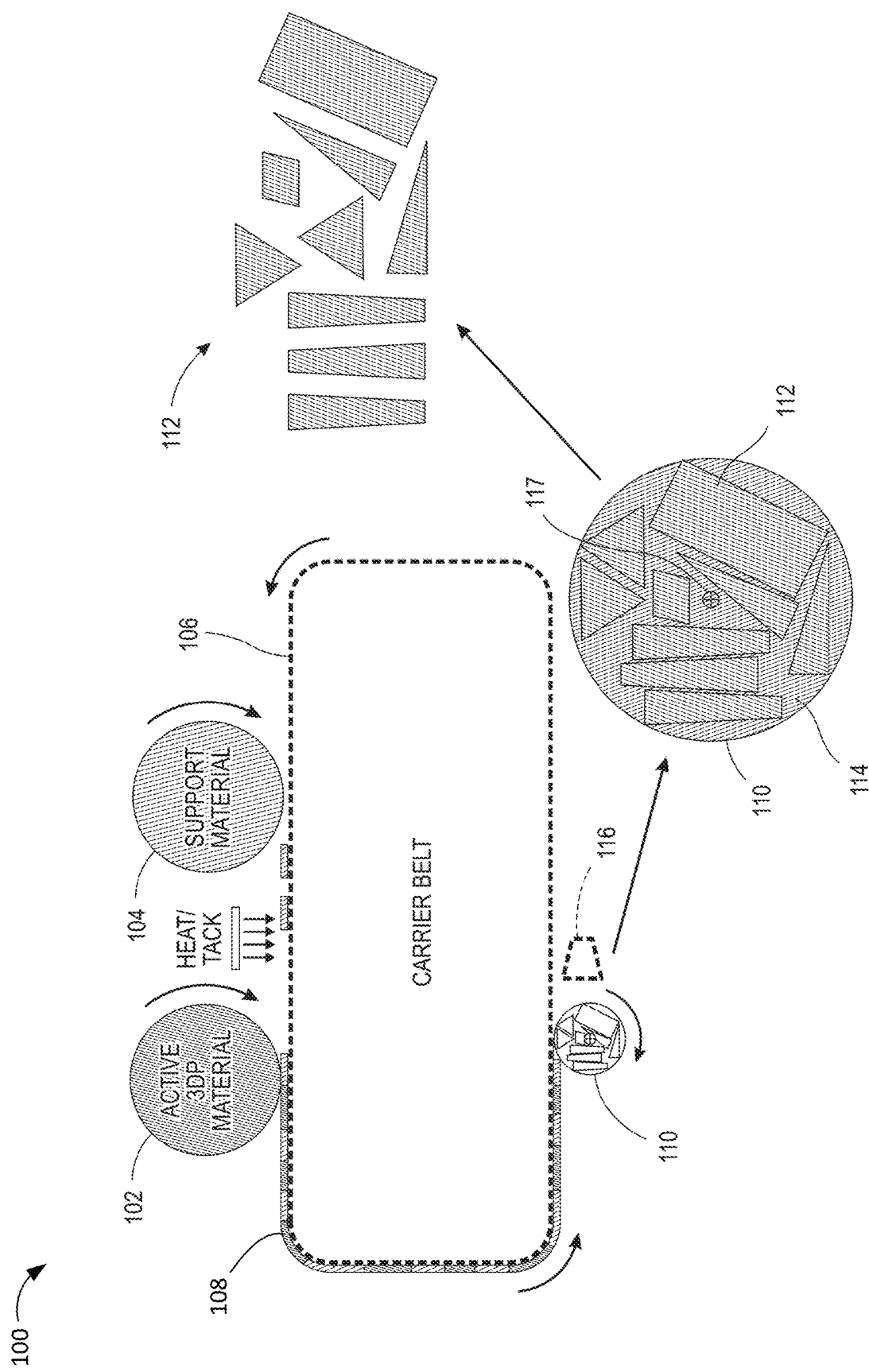
FIG. 1A is a diagram of an embodiment of a 3D printing system, in accordance with one embodiment of the present disclosure.

As discussed above, 3DP or AM technologies may rely on a layer-by-layer additive approach, in which a part (e.g., a workpiece) with the desired 3D geometry is created by repeatedly developing 2D patterns that are successively (sequentially) added on top of each-other. Such a process may lead to increases in process (fabrication) time due to the repeated, discontinuous, 'stop-and-go' or 'back-and-forth' nature of the layer-by-layer additive manufacturing approach. Moreover, the back-and-forth motion associated with the 2D layer development subsystems (and the required acceleration and deceleration within the short travel path for each layering step) limits the maximum linear speed with which each layer can be patterned/deposited. This stop-and-go nature of discontinuously layered 3DP/AM technologies and the mechanical limits on maximum deposition speeds due to the associated back-and-forth motion during each layer deposition step result in loss of productivity in terms of the overall manufacturing speed/part fabrication throughput that can be achieved by state-of-the-art 3DP/AM technologies. Thus, it would be useful to be able to fabricate parts more quickly by developing 3DP or AM systems or technologies that do not rely on the discontinuous, sequential stop-and-go processing approaches commonly utilized by existing 3DP/AM technologies.

Specifically, state of the art 3D printing techniques such as Selective Laser Sintering (SLS), Stereolithography (SLA), Solid-Ground Curing (SGC), Multi-Jet Fusion (MJF), and Laminated Object Manufacturing (LOM) rely on a layer-by-layer 'additive' approach, wherein a part with the desired 3-dimensional geometry is created from the material to be 3D printed (hereinafter "active material" or "active 3D printing material" or "active material to be 3D printed") by repeatedly developing 2-dimensional patterns (in the form of individual layers typically less than ~100-500 micrometers thick) that are successively added on top of each-other thereby 'building up' the desired part. Other 3DP/AM techniques such as Fused Deposition Modeling (FDM) and Laser Engineered Net Shaping (LENS) rely on creating a 1-dimensional (line) pattern that is written into a 2D (X-Y) layer and the desired 3D geometry is realized by continually "building up" the X-Y layers in the vertical (Z) direction. In many 3DP/AM techniques, a sacrificial material (hereinafter "support material" or "supporting material") may be added for each layer where the active 3D printing material was not deposited (to fill in the open areas/voids in the 2D pattern), before starting the subsequent (overlaid in the Z direction) layer so that overhangs in successive layers may be reliably deposited and supported on top of the underlying layers and the desired 3D printed parts may be temporarily supported within the build volume, till they are released from the 3D printing stage for post-processing (if needed) and subsequent use in the desired application, for which they are being produced.

In many instances of utilizing these inherently discontinuous techniques, there is a significant down-time between developing the successive layers. For example, in SLS/MJF or other Powder Bed Fusion (PBF) techniques, layering of the powder first and then patterning with (1) a laser beam (usually modulated/pattern-wise scanned using a galvo system) or (2) a binder (typically deposited using an inkjet-like print-head) in a sequential back-and-forth motion of the powder layering and development system means that the laser or binder jetting print-head (e.g., piezoelectric mechanism based print-head, thermal mechanism based print-head) is not developing patterns continuously (i.e., "discontinuous layering"). The above 3DP/AM systems may thus suffer from a significant (e.g., up to 50%) 'down-time' during which the development mechanism (e.g., laser/binder jet or other underlying patterning process) is waiting for the next layer to "get ready", in order to be patterned.

Moreover, the 2D layered approach typically relies on back-and-forth motion of multiple sub-systems/components of the development system (e.g., a powder spreader/compaction roller or binder jetting print-head assembly, etc.)—and the resulting start-accelerate-decelerate-stop-and-reverse sequence places fundamental mechanical limits on how fast the linear speed of the process can be during the patterning step, requires complex mechanical components that reduce system reliability, and adds significantly to the cost as much larger actuators and power supplies are required to generate these large accelerations needed to reduce fabrication times. The added weight and cost is particularly evident in multiaxis motions where the heavier actuators themselves must be rapidly accelerated/deaccelerated. Another problem with this sequential stop-and-go discontinuous layer-by-layer deposition is that this process tends to create flat planes of weaker mechanical properties which accelerate mechanical failure. Hence layer-by-layer deposited material can have inferior fracture, failure, and wear characteristics compared to the situation wherein the deposited layers were not in the form of flat planes.

Accordingly, as will be further appreciated, it may be useful to provide an Embedded High-speed Turning for Additive Layering (EHTAL) 3D printing system to allow significantly higher speed 3D printing of Additively Manufactured/3D printed parts. The EHTAL 3D printing system may include a continuously revolving roller on to which the patterned layer and any supporting material may be continuously added without having to resort to a back-and-forth or stop-and-go process. For example, the present techniques may include continuously adding on a layer in a concentric, spiral manner, and constructing to extend outwardly (e.g., "building out") the diameter of the rotating cylinder from a starting central core. By continuously adding (e.g., material deposition to cover the pattern in the immediately preceding layer) and patterning active and support materials onto the surface of such a growing cylinder, it would be possible to fabricate the desired shapes (e.g., various 3D printed shapes/parts) embedded within the support material. In this way, the 3D printed part(s) may be thus constructed to "grow" layer by layer in a continuous manner, without having the "stop-and-go" methodology and constant layer deposition step direction change due to the back-and-forth motion of the development (layer patterning) system. Thus, so long as the outwardly growing cylinder keeps turning and patterned active and support materials are added in a continuous fashion to support the outward growth of the turning cylinder, the desired 3D Printed/Additively Manufactured components (parts) embedded within the support material can be fabricated at a high speed in a continuous fashion without having to stop the patterning process after each layer as is done in state of the art layered 3D printing/Additive Manufacturing systems—thereby significantly reducing process time and improving the overall 3D printing speed and 3D printing/fabrication throughput as well as enhancing overall system reliability. Moreover, the continuous spiral deposition on the outer curved surface of the outwardly growing cylinder does not result in the flat planes of weakness described above, and therefore can minimize fracture or slippage planes in the resulting 3DP/AM parts because the continuously deposited curved layers within the rotating cylinder provide improved structural stability.

In accordance with the present embodiments, it may be useful to describe an EHTAL 3D printing system 100 as illustrated by FIG. 1A. As depicted, the 3D printing system 100 may include an active 3DP material 102 (e.g., Metal or Plastic powder, Metal Injection Molding (MIM) starting material comprising a polydisperse metal powder and polymer binder, or other suitable material that is to be patterned into a 3D part to be fabricated in the desired geometry) and support material 104 (e.g., inert powder or other material that will be easy to de-bind/wash away/dissolve/vaporize or otherwise remove in order to release the 3D printed parts of interest) that may be deposited on a continuously revolving cylinder 110 via a carrier belt 106. The carrier belt 106 may be referred to as a transfer belt. Specifically, a layer 108 including the patterned active 3DP material 102 and support material 104 may be continuously deposited on the surface of the belt 106, as the layer 108 moves along with the carrier belt 106. As the belt rotates counter-clockwise (as indicated by the curved arrows at the corner of the carrier belt 106), the layer 108 is moved towards the cylinder 110. The layer 108 may be applied to the cylinder 110 as the cylinder 110 rotates in conjunction with the belt 106. For example, the cylinder 110 may be positioned (e.g., positioned at a height) or oriented such that the outer surface of the cylinder 110 is in continuous contact with layer 108 to cause the layer 108 to transfer to the cylinder 110. The layer 108 may initially be applied to a core 117 of the cylinder 110, which may be referred to as a starting core, a central core, a starting central core, etc. As the cylinder 110 rotates, it may be built or grown outwards from the core 117 by continuous addition of the materials 102 and 104 via layer 108.

The cylinder 110 may be dynamically positioned to maintain the transfer of the layer 108 between the intermediate carrier belt 106 and an outer curved surface of the cylinder 110 (e.g., the position of the cylinder 110 may be adjusted such that the outer surface of the cylinder 110 is in continuous contact with the layer 108 to transfer the layer 108 to the cylinder 110). The core 117 may be attached to a rotating system (e.g., a rotating support axle, a motor that rotates the core 117, etc.). Additionally, a curing/forming system 116 may be used to cure or form the active material 102 as it is transferred to the cylinder 110. The curing/forming process may involve jetting of appropriate binder material, fusing via the application of energy in the form of heat or light such as a directed laser beam or infrared (IR) or ultraviolet (UV) or microwave radiation, or other mechanical or chemical techniques that will enable the formation of a bond between the constituents (e.g., constituent particles) of active material 102 and the underlying active material already deposited on cylinder 110 during the previous rotation. As the active and support materials 102 and 104 are continuously deposited on to the surface of the outwardly growing cylinder 110, the axis of rotation of the cylinder 110 containing the 3D printed parts is translated down (away) from the carrier belt 106 as the cylinder radius increases, so as to maintain consistent contact between the outer curved surface of cylinder 110 and layer 108 on belt 106. The speeds of the carrier belt 106 and the cylinder 110 are adjusted as the radius or the outwardly growing increases, so as to maintain synchronization of their surfaces and avoid slippage at the material transfer point (e.g., contact point between the belt 106, layer 108 and cylinder 110).

The carrier belt 106, the rollers that are used to deposit the materials 102 and 104, the rotating system used to rotate the cylinder 110, etc., may all be controlled by a control system/subsystem. For example, a computing device (e.g., a laptop computer, a server computer, a desktop computer, a tablet computer, a smartphone, etc.) may synchronize the operation (e.g., the speed of rotation) of the rollers, the rotating system, the carrier belt 106, etc. Finally, once all the desired 3D Printed/Additively Manufactured parts (3DP/AM parts) have been formed inside cylinder 110, the rotation of cylinder 110 may be stopped and the support material 114 surrounding the 3DP/AM parts removed to release the 3DP/AM parts 112 as shown in FIG. 1A. The removal of the support material 114 to release the 3DP/AM parts may happen by thermal (e.g., melting away/burning away), mechanical (e.g., mechanical separation, vibration, pulling apart/cleaning using appropriate tools), chemical (e.g., dissolution or etching away) and/or optical means (e.g., using lasers or directed infrared/ultraviolet light to disintegrate and remove support material).

Figure 1B:
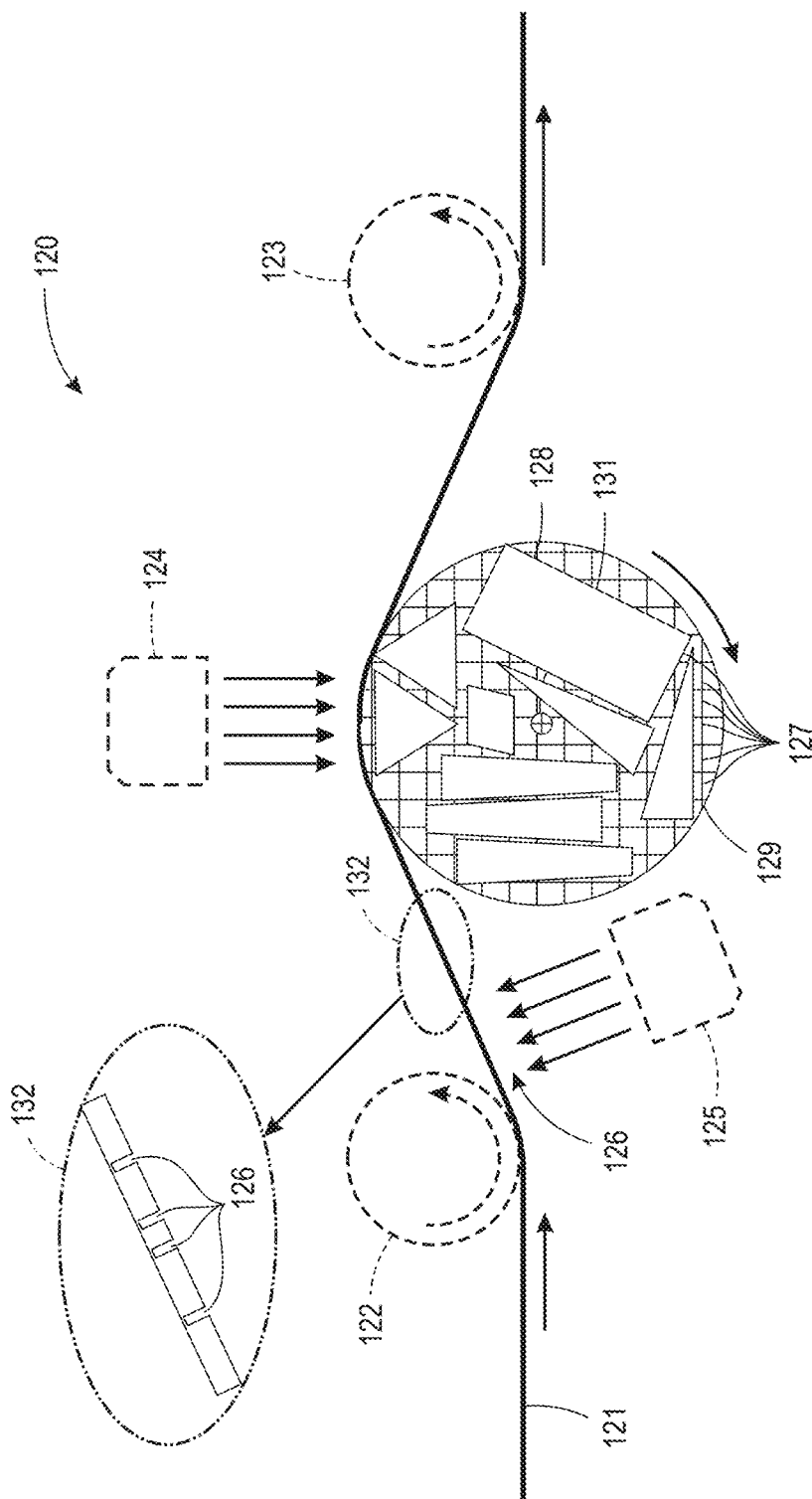
FIG. 1B is a diagram of an embodiment of a 3D printing system, in accordance with one embodiment of the present disclosure.

FIG. 1B is a diagram of an embodiment of a 3D printing system 120, in accordance with one embodiment of the present disclosure. The printing system 120 may fabricate one or more 3DP/AM parts by using a sequential, pattern-wise deposition of anti-sintering agents (e.g., de-binding agents). The 3D printing system 120 includes a carrier ribbon 121, active material 102, a cylinder 129, a roller 122, a roller 123, an anti-sintering/de-binding agent jetting subsystem 125, and a transfer component 124 that transfers the active material 102 being 3D printed along with any embedded patterned anti-sintering/de-binding agent(s), on to the outwardly growing cylinder 129. The cylinder 129 includes various 3D printed parts 128 which are illustrated by the shapes (e.g., the triangles, rectangles, trapezoids, parallelograms, etc.) within the cylinder 129.

As the rollers 122 and 123 turn or rotate counter-clockwise, the carrier ribbon 121 may move towards the right as shown in FIG. 1B. The anti-sintering jetting subsystem 125 may spray, shoot, deposit, or otherwise apply an anti-sintering agent 126 to the active material 102 that is on the surface of the carrier ribbon 121. The transfer component 124 may apply heat, light, mechanical vibration, or pressure at the contact between the ribbon 121 and the cylinder 129 in order to enable transfer of the active material 102 with the embedded patterned anti-sintering agent 126 on to the surface of continuously rotating and outwardly growing cylinder 129. The cylinder 129 includes a core 131 (e.g., a starting core, a central core, a starting central core, etc.). Initially, the active material 102 with the embedded patterned anti-sintering agent 126 may be transferred to the core 131 and later onto the outer surface of the cylinder 129 as the cylinder 129 is built, grown, etc. The core 131 may be attached to a rotating system (e.g., a rotating support axle, a motor that rotates the core 131, etc.). The anti-sintering jetting subsystem 125 may perform a pattern-wise deposition of the anti-sintering agent 126 on to the active material layer 102 on ribbon 121. For example, as illustrated in portion 132 of the active material layer 102, the anti-sintering agent 126 may be deposited (e.g., sprayed) onto the active material layer 102 to form a pattern. The anti-sintering agent is a material that would impede the formation of permanent bond between the particles/components comprising the active material 102 that is being 3D printed in this system. Once the deposition of the patterned anti-sintering material and the active material being 3D printed is completed, the cylinder 129 may be cured, for example, by heating in a furnace to an appropriate sintering temperature (typically >400 C for metal particles and >800 C for ceramic particles). The furnace may include heating elements to achieve the target heating temperature for effective sintering: e.g., electrical (resistive) heating elements, combustible gas (burner) heating elements, or microwave/infrared or other (radiative) heating elements. Other curing approaches that may be used include mechanical (e.g., mechanical compaction/pressure application), chemical (e.g., chemical reactions leading to formation of permanent bonds between the constituents of the active material) and/or optical means (e.g., using lasers or directed infrared/ultraviolet light in order to cure/fuse the constituents of the active material).

The embedded anti-sintering agent 126 in cylinder 129 forms cut lines 127 which act as separation points/boundaries upon sintering/curing of cylinder 129, as follows: After the curing/sintering step (e.g., by heating in a furnace or other suitable curing treatment to enable sintering/curing of cylinder 129), the anti-sintering material patterned into cylinder 129 would cause the formation of well-defined geometrical shapes (3D printed parts) by forming appropriate de-binding boundaries 127 between contiguous regions inside the cylinder 129. This may occur by a mechanism of the formation, e.g., of a weak or porous solid, such as by the dehydration and solidification of applied sol-gel slurry to a brittle ceramic solid that may disintegrate into a powder and naturally fall away from the 3D printed parts 128 along the de-binding boundaries defined by the patterned anti-sintering agent 126. The de-binding or anti-sintering agents/materials may include an applied polymeric material (e.g., Poly-alkylenecarbonates) that may decompose or degrade with the application of heat, or by other chemical means. This would produce a gap/break-away border(s) 127 between the build and support structures (and, optionally, produce additional break-away borders within the support structures to promote ease of separation, as shown in FIG. 1B) within the revolving cylinder 129. Other examples of anti-sintering material may include, but are not limited to, a suspension of particles that includes a sol-gel slurry of silicon alkoxide/hydroxide, aluminum alkoxide/hydroxide, or metal alkoxide or hydroxide, a resin (e.g., a synthetic resin, epoxy resin, etc.) a polymeric/metal mixture, a polymeric/ceramic mixture and a polymeric/inorganic mixture, a dissolvable or dehydratable inorganic salt solution or slurry, of which at least one component of the solution or slurry may undergo degradation or decomposition with the application of at least one of heat, light, and/or a chemical agent.

In some embodiments, combinations of ceramic slurry, ceramic particles, and polymeric solutions may also be used as the de-binding agent. For example, a solution or slurry of a metal halide or other non-reacting salt may be used as a de-binding agent, where upon dehydration or exposure to an appropriate solvent (e.g. water), the salt crystals remaining will fall away or dissolve to separate the 3D printed parts 128 and surrounding support structure. In one embodiment, once the revolving cylinder 129 with embedded 3D printed parts 128 is formed, the cylinder rotation may be stopped and the pre-sintering stage parts, for example, may be separated first and sintered in a furnace subsequently. In another embodiment, the entire cylinder 129 may be sintered in the furnace and the support structures may be removed thereafter by a variety of means, including but not limited to mechanical separation, chemically etching or dissolving the boundary between the parts of interest and support material, melting away the support material, ablating away the support material using optical (e.g., laser or directed infrared/ultraviolet light), etc.

The carrier ribbon 121, the rotation system for rotating the cylinder 129, the roller 122, the roller 123, the anti-sintering jetting subsystem 125, and the transfer component 124, etc., may all be controlled by a control system/subsystem. For example, a computing device may synchronize the operation (e.g., the speed of rotation) of the carrier ribbon 121, the rotation system for rotating the cylinder 129, the roller 122, the roller 123, the anti-sintering jetting subsystem 125, and the transfer component 124, etc.

Figure 1C:
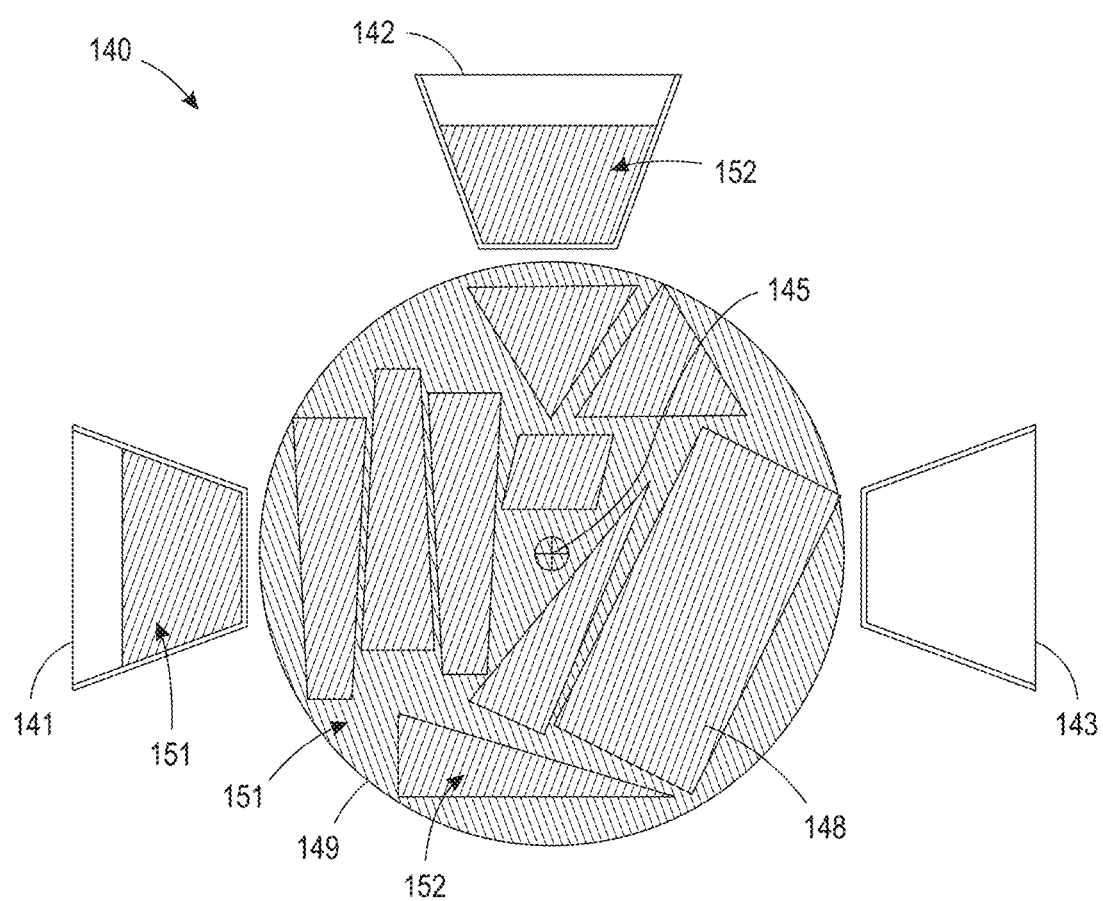
FIG. 1C is a diagram of an embodiment of a 3D printing system, in accordance with one embodiment of the present disclosure.

FIG. 1C is a diagram of an embodiment of a 3D printing system 140, in accordance with one embodiment of the present disclosure. The printing system 140 may fabricate one or more 3DP/AM parts by using a pattern-wise deposition of active material 152 and support material 151. The 3D printing system 140 includes a support material deposition subsystem 141, an active material deposition subsystem 142, a curing subsystem 143, and a cylinder 149 including a starting central cylindrical core 145. The cylinder 149 includes various 3D printed parts 148 which are illustrated by the shapes (e.g., the triangles, rectangles, trapezoids, parallelograms, etc.) within the cylinder 149. These 3DP/AM parts are formed via continuous deposition of patterned active and support materials 152 and 151 on the curved surface of cylinder 149 as it rotates in a continuous, non-stop fashion during the pattern deposition step. At the end of the continuous deposition step during which the cylinder 149 is continuously turned and outwardly grown by continuous addition of the patterns of active and support materials 152 and 151, the cylinder 149 thus includes 3DP/AM parts 148 comprising active material 152 that are embedded within support material 151 which fills the space between the various 3DP/AM parts 148.

In the 3D printing system 140, the technique of continuous spiral 3D printing on a high speed continuously revolving cylinder 149 (as discussed herein) may also be used with a variety of underlying 2D pattern development mechanisms that would enable continuous forming (e.g., additive layering) on the outer curved surface of the extending (i.e., diametrically growing) geometry of the cylinder 149. For example, a first subsystem 141 (e.g., an inkjet-like print head, a extrusion print-head, a doctor-blade based deposition system, etc.) may be used to print (e.g., deposit, spray, apply, etc.) the support material 151 (e.g., a wax based ink, or a slurry containing ceramic or metal/metal alloy particles) onto the surface of the cylinder 149 and a second subsystem 142 may be used to print the active material 152 (e.g., an ultra-violet (UV) curable resin, or a slurry containing ceramic or metal/metal alloy particles, or a metal injection molding [MIM] slurry containing a mixture of polydisperse metal/metal alloy/ceramic powder & polymer binder) onto the surface of the continuously revolving cylinder 149. The active material 152 and the support material 151 may be printed such that the active material 152 and the support material 151 define a 2D pattern on the outer curved surface of cylinder 149. The 2D pattern is formed on the continuously revolving cylinder 149 in a continuous fashion (i.e., without any 'stop-and-go' or 'back-and-forth' motion that is typically used in state of the art 3DP/AM systems). As the cylinder 149 rotates continuously in a given direction and the active material 152 and the support material 151 are deposited, applied, etc., onto the cylinder 149, the cylinder may grow or extend outwardly (e.g., "building out"). For example, 3D printing system 140 may grow, extend, or increase the diameter of the rotating cylinder starting from a core 145 (e.g., a starting core, a central core, a starting central core, etc.) by continuously adding layers of the active material 152 and support material 151 to the outer surface of the cylinder 149. For example, the 3D printing system 140 may initially add layers of active material 152 and support material 151 onto the core 145 and may continue to deposit the active material 152 and support material 151 onto the outer curved surface of the cylinder 149. The core 145 may be attached to a rotating system (e.g., a rotating support axle, a motor that rotates the core 145, etc.). Continuous (e.g., on-the-fly) curing may be performed using curing subsystem 143, which provides for example, a UV light source (photopolymerization based curing), or a patterned light source using light (radiation) of wavelength between 200 nanometers to 10 micrometers (optical/radiation curing), or a laser or another source of heat (thermal curing) or a jetting subsystem that provides patterned deposit of appropriate binding/curing agent (chemical curing). Once the desired 3D printed parts 148 have been formed inside the revolving outwardly grown cylinder 149, the cylinder 149 may be stopped from rotating and removed from the system 140 and the support material 151 may be melted or washed away or removed by other thermal, mechanical, optical or chemical means as described previously, and the cured 3D printed parts 148 may be released.

As illustrated in FIG. 1C, subsystems 141 and 142 are used to sequentially deposit, apply, spray, print, etc., the support material 151 and the active material 152 onto the continuously rotating cylinder 149. For example, in one embodiment, the support material 151 may be applied or deposited onto the outer curved surface of continuously rotating cylinder 149 (by the subsystem 141), after the active material 152 has been applied or deposited onto the cylinder 149 (by the subsystem 142). In this embodiment, the cylinder 149 would rotate continuously in a counter-clockwise fashion in FIG. 1C and the support material 151 may be filled into the spaces between the active material 152 using a doctor blade (e.g., the support material 151 may be doctor bladed to fill the spaces between the active material 152.). For example, the support material 151 may be applied to the outer surface of the cylinder 149 or to a doctor blade, and the doctor blade may be pressed against the outer surface of the cylinder 149 as the cylinder 149 rotates counter-clockwise. Although one active material deposition subsystem 142 and one support material deposition system 141 are illustrated in FIG. 1C, the 3D printing system 140 may include multiple active material deposition subsystems in other embodiments (not shown in FIG. 1C). The active material deposition subsystems may deposit, e.g., different types of active materials to form 3D printed parts that are composed of multiple materials (e.g., 3D printed parts made of a composite of materials or separate 3D printed parts made of separate active materials). In another embodiment, the support material 151 may be applied or deposited onto the cylinder 149 (by the subsystem 141), before the active material 152 has been applied or deposited (by the subsystem 142) onto the outer curved surface of continuously rotating cylinder 149. In this embodiment, the cylinder 149 would rotate continuously in a clockwise fashion in FIG. 1C and the active material 152 may be filled into the spaces between the support material 151, e.g., using a doctor blade (e.g., the active material 152 may be doctor bladed to fill the spaces between the support material 151). For example, the active material 152 may be applied to the outer surface of the continuously clock-wise rotating cylinder 149 or to a doctor blade, and the doctor blade may be pressed against the outer surface of the continuously clock-wise rotating cylinder 149 as the cylinder 149 rotates—followed by a deposition of the active material 151 to fill in the open areas. Although one active material deposition subsystem 142 and one support material deposition system 141 are illustrated in FIG. 1C, the 3D printing system 140 may include multiple active material deposition subsystems in other embodiments (not shown in FIG. 1C). The active material deposition subsystems may deposit, e.g., different types of active materials to form 3D printed parts that are composed of multiple materials (e.g., 3D printed parts made of a composite of materials or separate 3D printed parts made of separate active materials).

As the active and support materials 152 and 151 are continuously deposited on to the surface of the outwardly growing cylinder 149, the subsystems 142 and 141 are continuously moved (translated) away from the axis of the rotating cylinder 149 as its radius increases, so as to maintain the optimal distance (typically less than 10 millimeters) between the subsystems 142 and 141 and the outer surface of outwardly growing cylinder 149 in order to ensure reliable deposition of the materials 152 and 151. Moreover, in one embodiment, the rotational speed of the cylinder 149 (e.g., number of revolutions per minute or RPM) may be continuously adjusted to maintain a fixed linear speed of the growing outer curved surface in order to maintain optimal deposition conditions for subsystems 152 and 151. In another embodiment, the rotational speed of the cylinder 149 (e.g., number of revolutions per minute or RPM) may not be continuously adjusted and the operating state/operating speed of the deposition subsystems 141 and 142 and curing subsystem 143 may be continuously adjusted in order to maintain optimal deposition conditions for subsystems 152 and 151 and curing conditions for subsystem 143.

The rotation system for rotating the cylinder 149, the support material deposition subsystem 141, the active material deposition subsystem 142, the curing subsystem 143, etc., may all be controlled by a control system/subsystem. For example, a computing device may synchronize the operation of the rotating system and the active material deposition subsystem 142, the curing subsystem 143.

Figure 1D:
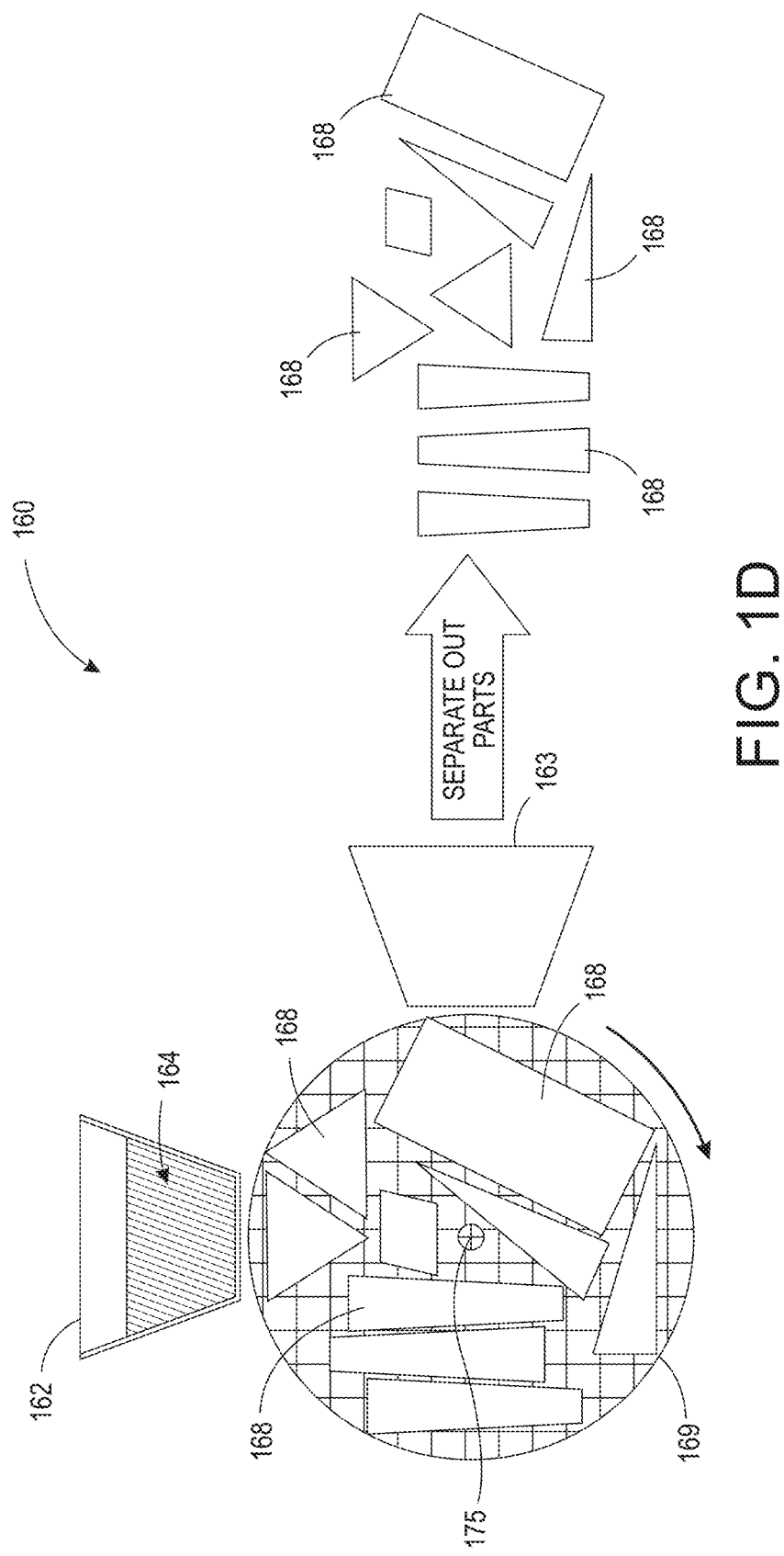
FIG. 1D is a diagram of an embodiment of a 3D printing system, in accordance with one embodiment of the present disclosure.

FIG. 1D is a diagram of an embodiment of a 3D printing system 160, in accordance with one embodiment of the present disclosure. The printing system 160 may fabricate one or more 3D parts by using a sequential deposition of the active material being 3D printed and pattern-wise deposition of appropriate anti-sintering agents (e.g., de-binding agents). The 3D printing system 160 includes an active material deposition subsystem 162, an anti-sintering agent deposition subsystem 163, and a cylinder 169. The cylinder 169 includes various 3D printed parts 168 which are illustrated by the shapes (e.g., the triangles, rectangles, trapezoids, parallelograms, etc.) within the cylinder 169.

The active material deposition system 162 may deposit (e.g., spray, shoot, deposit, extrude or otherwise mechanically apply) the active material 164 to be 3D printed onto the cylinder 169 to the surface (e.g., the outer surface) of the cylinder 169. The active material may comprise, e.g., an ultra-violet (UV) curable resin, or a slurry containing ceramic or metal/metal alloy particles, or a metal injection molding [MIJM] slurry containing a mixture of polydisperse metal/metal alloy/ceramic powder & polymer binder. The anti-sintering jetting subsystem 163 may perform a pattern-wise deposition of an anti-sintering agent. For example, the subsystem 163 may spray the anti-sintering agent onto the active material in a pattern (e.g., a 2D pattern or shape) on the outer surface of the continuously rotating and outwardly growing cylinder 169. The anti-sintering jetting subsystem 163 may thus create an anti-sintering agent pattern on to the active material that is continuously deposited on the surface of the cylinder 169 as the cylinder 169 rotates in a continuous, clock-wise fashion as indicated in FIG. 1D. The active material and the anti-sintering agent may be applied to the cylinder 169 sequentially. For example, the active material may be applied or deposited onto the cylinder 169 first (by the subsystem 162), and the anti-sintering agent may be applied or deposited onto the cylinder 169 second (by the anti-sintering jetting subsystem/print-head 163) as the cylinder 169 rotates in a continuous, clockwise fashion, as indicated by the arrow in FIG. 1D The anti-sintering agent may be applied to the active material to define boundaries between contiguous cured zones in the cylinder 169. The boundaries may be or may define de-binding regions that allow the 3D printed parts 168 to be separated from each other or separated from the rest of the material in the cylinder 169 (e.g., the active material that fills the space between the 3D printed parts 168). The anti-sintering agent (which is deposited onto the surface of the cylinder 169 as it turns and grows outwardly) may be composed of any material that, upon the application of heat (or other suitable physical/chemical mechanism) to sinter the 3D printed parts 168, may provide a de-binding/separation boundary between the 3D printed parts 168 and the support structures. This may occur by a mechanism of the formation of a weak or porous solid, such as by the dehydration and solidification of applied sol-gel slurry to a brittle ceramic solid that may dissolve into a powder and naturally fall away from the 3D printed parts 168. Other anti-sintering materials may include an applied polymeric material (e.g., Poly-alkylenecarbonates) that may decompose or degrade with the application of heat, or by other chemical means. This would produce a boundary to aid the separation of the build and support structures within the cylinder 169. The cylinder 169 includes a core 175 (e.g., a starting core, a central core, a starting central core, etc.). Initially, the active material may be transferred to the core 175 and later onto the outer surface of the cylinder 169 as the cylinder 169 is built, grown diametrically outward (i.e., grown by increasing the diameter), etc. The core 175 may be attached to a rotating system (e.g., a rotating support axle, a motor that rotates the core 175, etc.).

As the active material 164 is continuously deposited on to the surface of the rotating and outwardly growing cylinder 169, the subsystems 162 and 163 may be continuously moved (translated) away from the axis of the rotating cylinder 169 as its radius increases, so as to maintain the optimal distance (typically less than 10 millimeters) between the subsystems 162 and 163 and the outer surface of cylinder 169 in order to ensure reliable deposition of the active material and anti-sintering agents. Moreover, the rotational speed of the cylinder 169 (e.g., number of revolutions per minute or RPM) may be continuously adjusted to maintain a fixed linear speed of the outer surface in order to maintain optimal deposition conditions for subsystems 162 and 163. In another embodiment, the rotational speed of cylinder 169 (e.g., revolutions per minute or RPM) may be kept fixed (i.e., not adjusted as above) and the print/deposition rate from subsystems 162 and 163 may be adjusted to track the speed of motion of the outer curved surface of the growing & continuously rotating cylinder 169.

In some embodiments, combinations of ceramic slurry, ceramic particles, and polymeric solutions may be used as the debinding agent. For example, a solution or slurry of a metal halide or other non-reacting salt may be used as a debinding agent, where upon dehydration or exposure to an appropriate solvent (e.g. water) or other chemical, the salt crystals remaining will fall away or dissolve to separate the 3D printed parts 168 (with boundaries defined by the patterned anti-sintering agent from subsystem 163 and surrounding support structure. Once the revolving cylinder 169 with all the desired embedded 3D printed parts 168 is formed, the rotation of cylinder 169 may be stopped, and the pre-sintering stage parts, for example, may be separated along the boundaries defined by the patterned de-binding agent and subsequently sintered in a furnace. In another embodiment, the entire cylinder 169 may be removed from the system and sintered in the furnace (or the rotation may be stopped and cylinder 169 may be sintered in-situ) and the support structures may be removed thereafter by a variety of means, including but not limited to mechanical separation, chemically etching or dissolving the boundary between the parts of interest and support material, melting away the support material, using optical means (e.g., laser/focused infrared or UV light, etc.). As illustrated in FIG. 1D, the individual 3D parts 168 may be removed from the cylinder 169 by separating the parts from the cylinder 169 along boundaries (e.g., de-binding boundaries) formed by the patterned anti-sintering agents deposited in the cylinder 169 during the above-described fabrication process.

The rotation system for rotating the cylinder 169, the subsystems 162 and 163, etc., may all be controlled by a control system/subsystem. For example, a computing device may synchronize the operation of the rotating system and the subsystems 162 and 163.

Figure 2A:
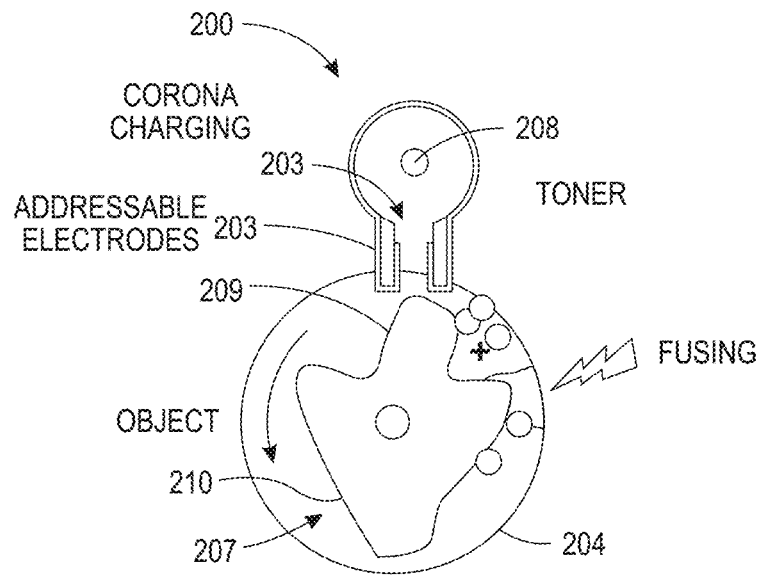
FIG. 2A is a diagram of a 3D printing system including an ionography application, in accordance with one embodiment of the present disclosure.
Figure 2B:
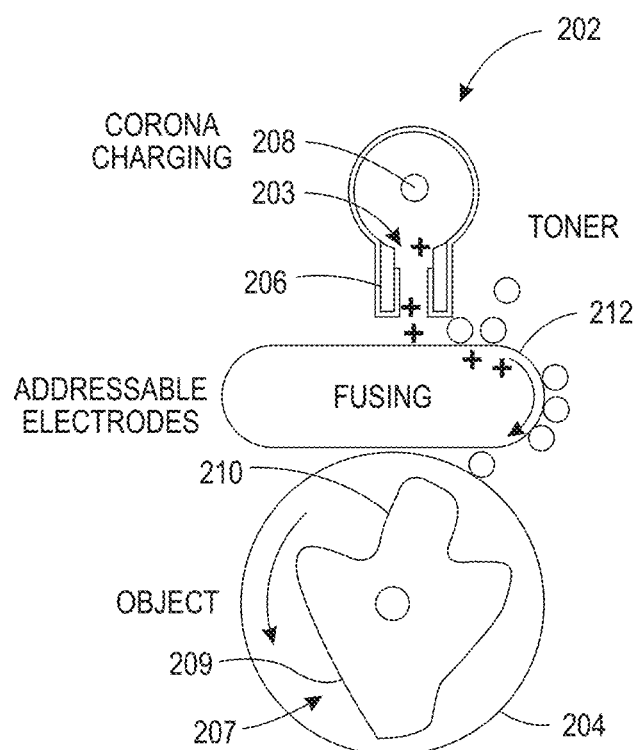
FIG. 2B is a diagram of a 3D printing system including an ionography application, in accordance with one embodiment of the present disclosure.

FIGS. 2A and 2B illustrate systems for applying ionography in conjunction with the presently disclosed techniques. Specifically, the present EHTAL 3D printing techniques may be used in conjunction with ionography for developing layered patterns. For example, as illustrated by ionography EHTAL 3D printing systems 200 and 202 of FIGS. 2A and 2B, respectively, spatial patterns of charged ions may be deposited by the corona charging unit which is a product wide cylinder extending into the figure in FIG. 2A with an air source (not shown) blowing the charged ions through a slit 203 utilizing, for example, independently controlled electrodes 206 which extend over the entire width of the slit 203 within the corona charging unit to vary the corona charge 208 deposited on an object 210 (e.g., workpiece). In order that the charge retains its spatial pattern, the object 210 and 3D printing material may, in some embodiments, include non-conductive materials. As further depicted by FIGS. 2A and 2B, the oppositely charged toner particles may be directed towards the charge patterns, such that the toner particles may stick where the charge resides. Following the toner particle deposition stage, a fusing stage may be provided to bind the particles to the previously printed layer. In this way, the 3D printed part may be thus constructed to extend layer by layer in a continuous manner, and thereby reducing process time. FIG. 2B has a transfer belt 212 on which the patterned charge is deposited by modulating the electrodes 206 of the corona charging unit. Oppositely charged toner particles are applied to the transfer belt 212 and carried to the object roller 204 to deposit and fuse a layer 209 of the object 210. The corona charge can also be used to deposit support material 207. The object roller 204 rotates at the same speed (measured on the outermost surface in contact with the transfer belt), as the transfer belt 212 so there is no slippage. As the object layers are added, the cylinder 204 containing the 3D object is translated down from the transfer belt as the cylinder radius increases. The speed of the transfer belt 212 and the object containing cylinder are adjusted as the radius increases.

The rotation system for rotating the object 210, the object roller 204, the transfer belt, the fusing system, etc., may all be controlled by a control system/subsystem. For example, a computing device may synchronize the operation of the object 210, the object roller 204, the transfer belt, the fusing system.

Figure 3:
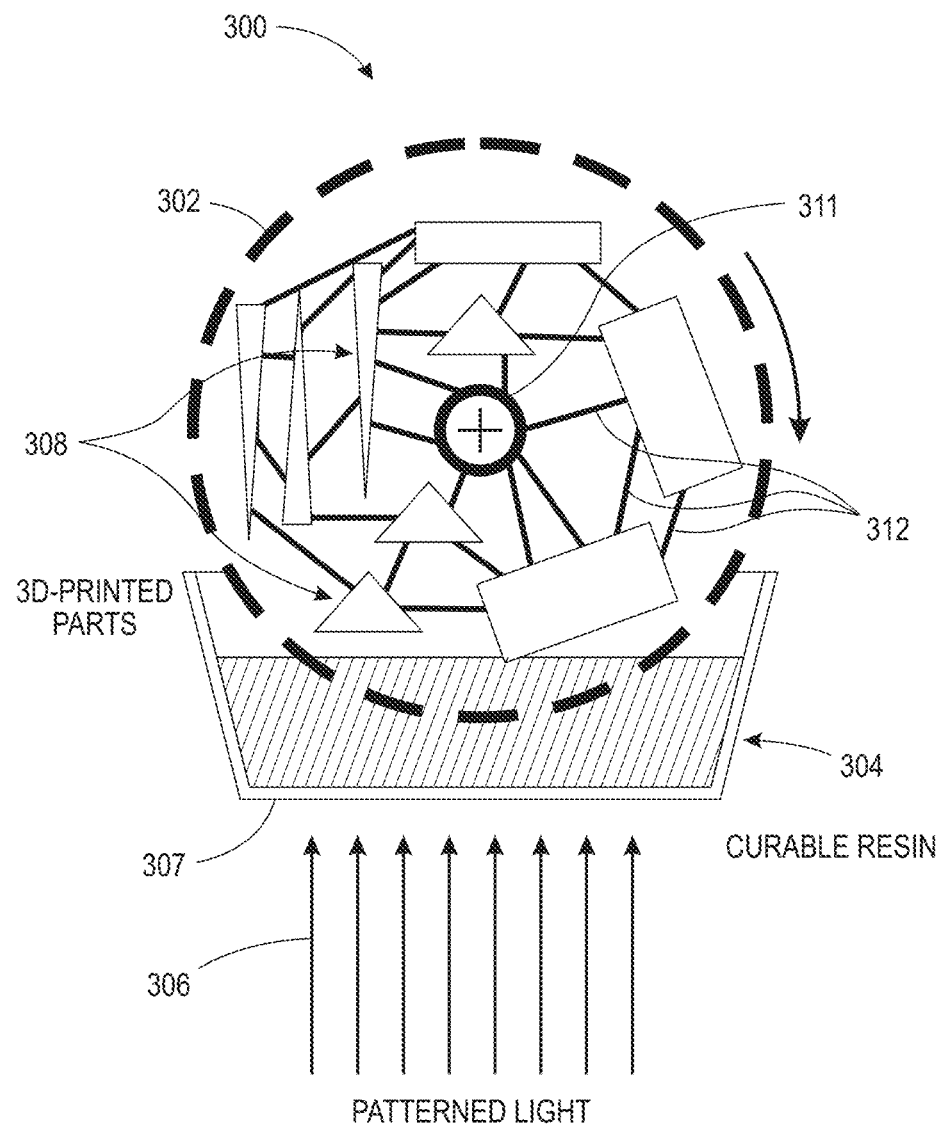
FIG. 3 is a diagram of a 3D printing system utilizing curable resins and patterned light, in accordance with one embodiment of the present disclosure.

FIG. 3 illustrates a system 300 for using curable resins in conjunction with the presently disclosed techniques. For example, the revolving cylinder 302 may be partially immersed in a reservoir 304 of photo-curable resin (e.g., similar resin to what is used in Stereolithography or SLA), which may be developed simultaneously or concurrently with the immersion (e.g., the partial immersion of the revolving cylinder 302) utilizing, for example, patterned light or radiation 306 of certain desired wavelength (e.g., ultraviolet [UV], X-ray, etc.). In the illustrated embodiment, rather than using cured support material as previously discussed above with respect to FIG. 1A, for example, truss-like structures 312 may be developed as part of the curing/development step to hold the 3D parts 308 together as they are constructed, as depicted by FIG. 3. As illustrated in FIG. 3, the 3D parts 308 are attached to the truss-like structures 312. These parts 308 can be separated from the support structures 312 after 3D fabrication is completed. As the cylinder 302 rotates continuously, the 3D parts 308 that are being formed are immersed in the reservoir 304 of photo-curable resin. The patterned light 306 (e.g., a patterned UV light, X-ray light, etc.) may be used to cure the photo-curable resin as the 3D parts 308 are dipped into the reservoir 304 of photo-curable resin. The cylinder 302 includes a starting core 311 (e.g., a starting core, a central core, a starting central core, etc.) which provides an initial surface where the photo-curable resin may be deposited. The core 311 may be attached to a rotating system (e.g., a rotating support axle, a motor that rotates the core 311, etc.).

In some embodiments, the bottom 307 of the reservoir 304 may be transparent or partially transparent. This may allow the patterned light 306 to be transmitted through the bottom 307 of the reservoir 304 onto the 3D parts 308. The cylinder 302 may be positioned such that the 3D parts 308 are close to the bottom of the reservoir 304. For example, the cylinder 302 may be positioned such that a 3D part 308 may be between a few micrometers to 10 millimeters or some other appropriate distance from the bottom of the reservoir 304 at its lowest point during the rotation of cylinder 302. This allows the patterned light 306 to cure the thin layer of photo-curable resin that may be between a 3D part 308 and the bottom of the reservoir 304. This allows the system 300 to grow, build, extend outwardly away from the axis of rotation, etc., the 3D parts 308 in a continuous fashion as the cylinder 302 and core 311 rotate in a continuous fashion. The bottom 307 of the reservoir 304 may also be oxygen permeable. For example, the bottom 307 of the reservoir 304 (or other portions of the reservoir 304) may allow oxygen (or other gases) from the outside of the reservoir 304 to pass through to the inside of the reservoir 304.

In some embodiments, the bottom of the reservoir 304 may be a transparent or partially transparent oxygen permeable membrane or oxygen carrying mesh. This allows for a steady oxygen supply, which allows the patterned light 306 to cure the thin layer of photo-curable resin in a controlled fashion and reduces variations in the curing step.

In another embodiment (not shown in FIG. 3), the revolving cylinder 302 may not be dipped or immersed into a reservoir. Instead, a thin layer of curable resin may be applied to different portions of the 3D part 308. For example, a jet head, brush, aerosol nozzle or other tool may be used to apply a thin layer of curable resin.

The rotation system for rotating the revolving cylinder 302, the patterned light 306, etc., may all be controlled by a control system/subsystem. For example, a computing device may synchronize the operation of rotation system and the patterned light 306.

Figure 4:
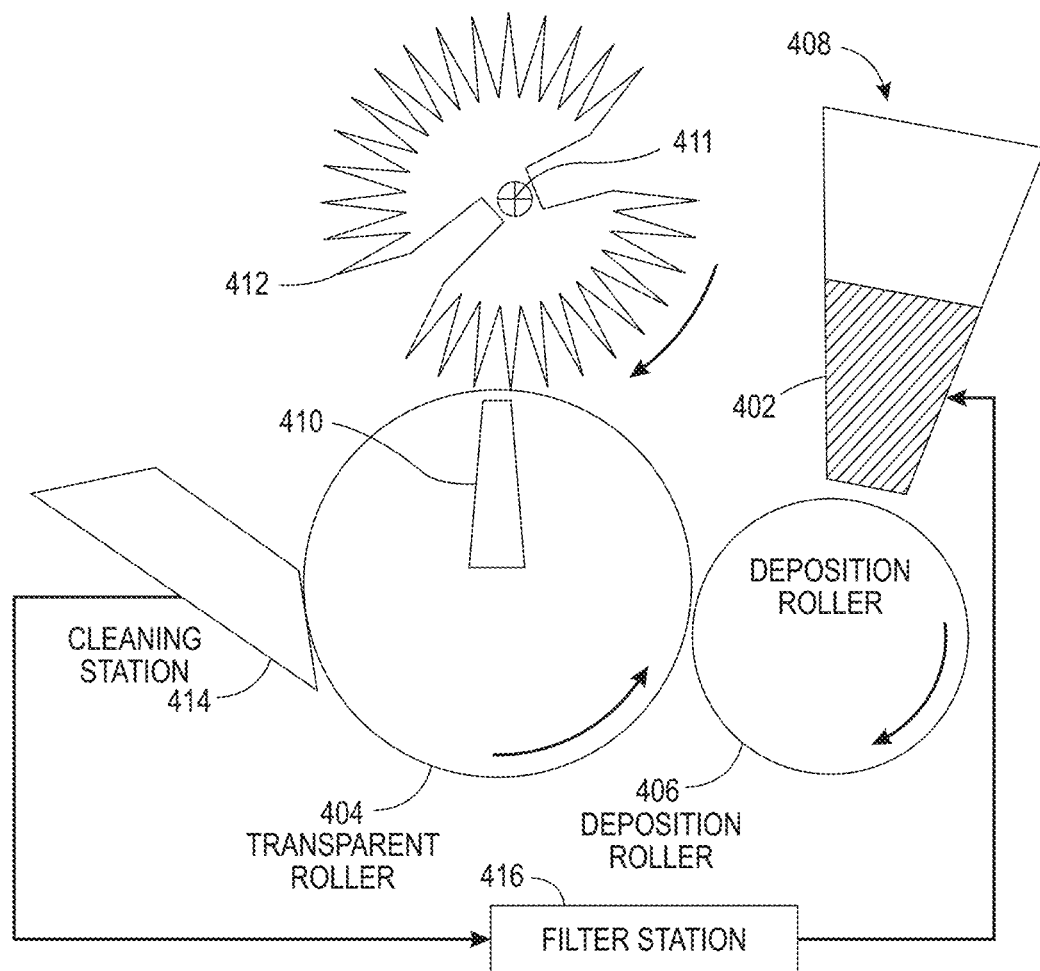
FIG. 4 is a diagram of a continuous roll-to-roll 3D printing process system, in accordance with one embodiment of the present disclosure.

FIG. 4 illustrates a continuous roll-to-roll 3D printing process system 400 that may be utilized in conjunction with the presently disclosed techniques. For example, as illustrated, in certain embodiments, a continuous roll-to-roll 3D printing process may include a thin layer of powder curable slurry or curable resin 402, which may be provided onto a continuous transparent roller 404 via a deposition roller 406. In some embodiments, the slurry 402 (e.g., including photocurable polymer) may be homogeneously distributed from a reservoir 408 (e.g., doctor-bladed) onto the transparent roller 404 or the deposition roller 406. The curable slurry or resin may be split from the deposition roller 406 onto the transparent roller 404. As further illustrated, the transparent roller 404 may house a Digital Light Patterning system (DLP) 410 and may be covered by carrier foil for quick release of the slurry or resin, in some embodiments.

In some embodiments, the DLP 410 may pattern the slurry 402 when in contact with a building roller 412. The building roller 412 includes a core 411 (e.g., a starting core, a central core, a starting central core, etc.). The core 411 may be an initial surface where the curable polymer 402 may be initially deposited. The core 411 may be attached to a rotating system (e.g., a rotating support plate, a motor that rotates the core 411, etc.). The revolving building roller 412 and transparent roller 404 are to be moved away from each other to increase their relative distance during the 3D printing process and allow the building roller 412 to extend outward. Moreover, the rotational speed of the building roller 412 and transparent roller 412 (e.g., number of revolutions per minute or RPM) may be continuously adjusted to maintain a fixed linear speed of the outer surface of the building roller 412 in order to maintain optimal deposition conditions of curable slurry and resin 402. The uncured slurry 402 may be cleaned from the transparent roller 404 via a cleaning station 414 and may be recycled via a filter station 416. The completed 3D printed parts may be removed from the building roller 412 after the printing process, and sacrificial poles to stabilize the 3D printed parts may be removed in post processing. Lastly, the polymer introduced by the slurry 402 may be removed by burning away or dissolving in a solvent or by other mechanical or chemical means, and the 3D printed part may be sintered and released.

The rotation system for rotating the building roller 412, the transparent roller 404, the deposition roller 406, the reservoir 408, etc., may all be controlled by a control system/subsystem. For example, a computing device may synchronize the operation of the building roller 412, the transparent roller 404, the deposition roller 406, and the reservoir 408.

Figure 5:
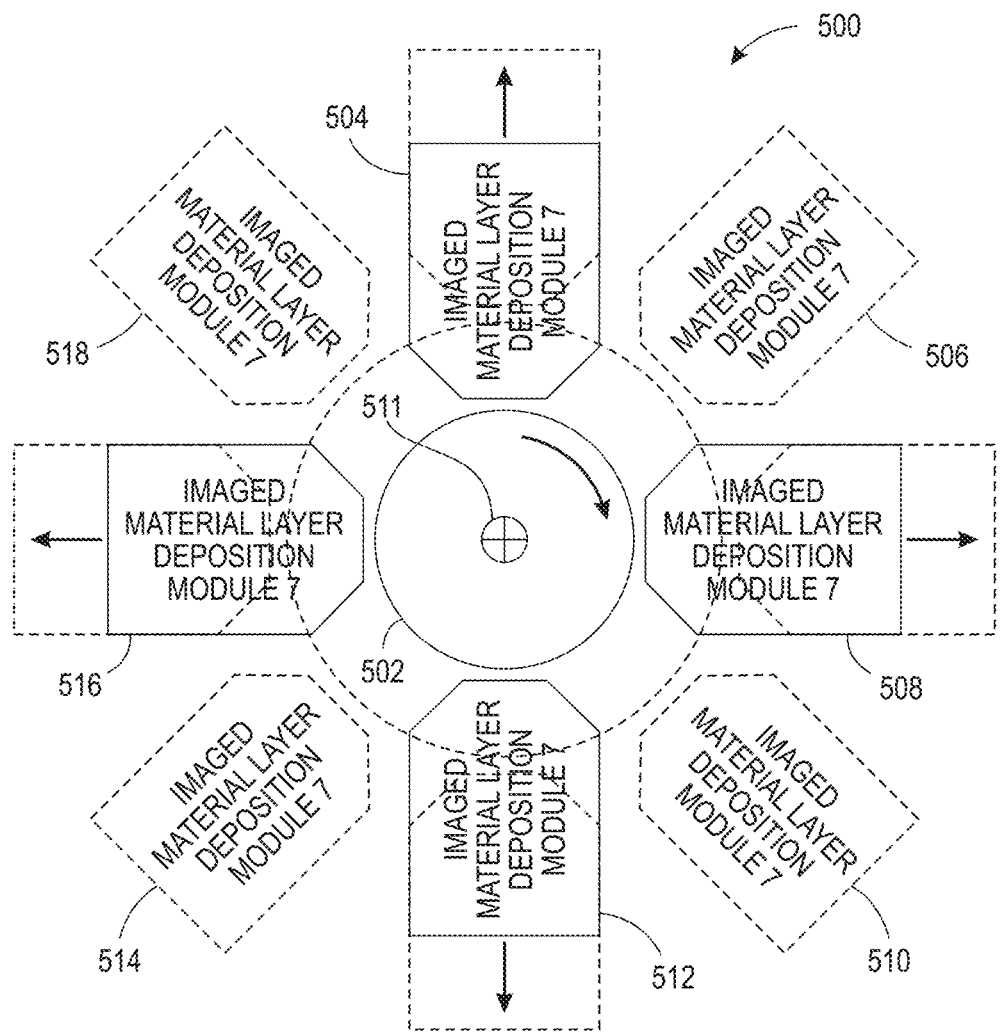
FIG. 5 is a diagram of an embodiment of a multi-material integrated 3D printing system, in accordance with one embodiment of the present disclosure.

FIG. 5 illustrates a multi-material process integration system 500 that may be utilized in conjunction with the presently disclosed techniques. Specifically, FIG. 5 depicts that a cylinder 502 that extends outwardly which during the 3D printing process, various materials and composite material print-heads 504, 506, 506, 508, 510, 512, 514, 516, and 518 with a variety of pattern development approaches may be moved radially in and out to enable a general-purpose, multi-material capable 3D printing technique. While only composite material print-heads 504, 506, 506, 508, 510, 512, 514, 516, and 518 are included in FIG. 5 for the purpose of illustration, it should be appreciated that any number of materials and composite material print heads 504, 506, 506, 508, 510, 512, 514, 516, and 518 as well as anti-sintering agent/de-binding agent deposition subsystems may be included in implementation of the present embodiments. In this way, the 3D printed part may be thus constructed with various materials layer by layer in a continuous manner by embedding the desired 3DP/AM parts to be fabricated inside a continuously rotating, outwardly growing cylinder 502, and thereby reduce process time. The cylinder 502 includes a starting core 511 (e.g., a starting core, a central core, a starting central core, etc.) which provides an initial surface where the composite material may be deposited. The core 511 may be attached to a rotating system (e.g., a rotating support axle, a motor that rotates the core 511, etc.).

The rotation system for rotating the cylinder 502, composite material print-heads 504, 506, 506, 508, 510, 512, 514, 516, and 518, etc., may all be controlled by a control system/subsystem. For example, a computing device may synchronize the operation of the rotation system, composite material print-heads 504, 506, 506, 508, 510, 512, 514, 516, and 518, etc.

Figure 6:
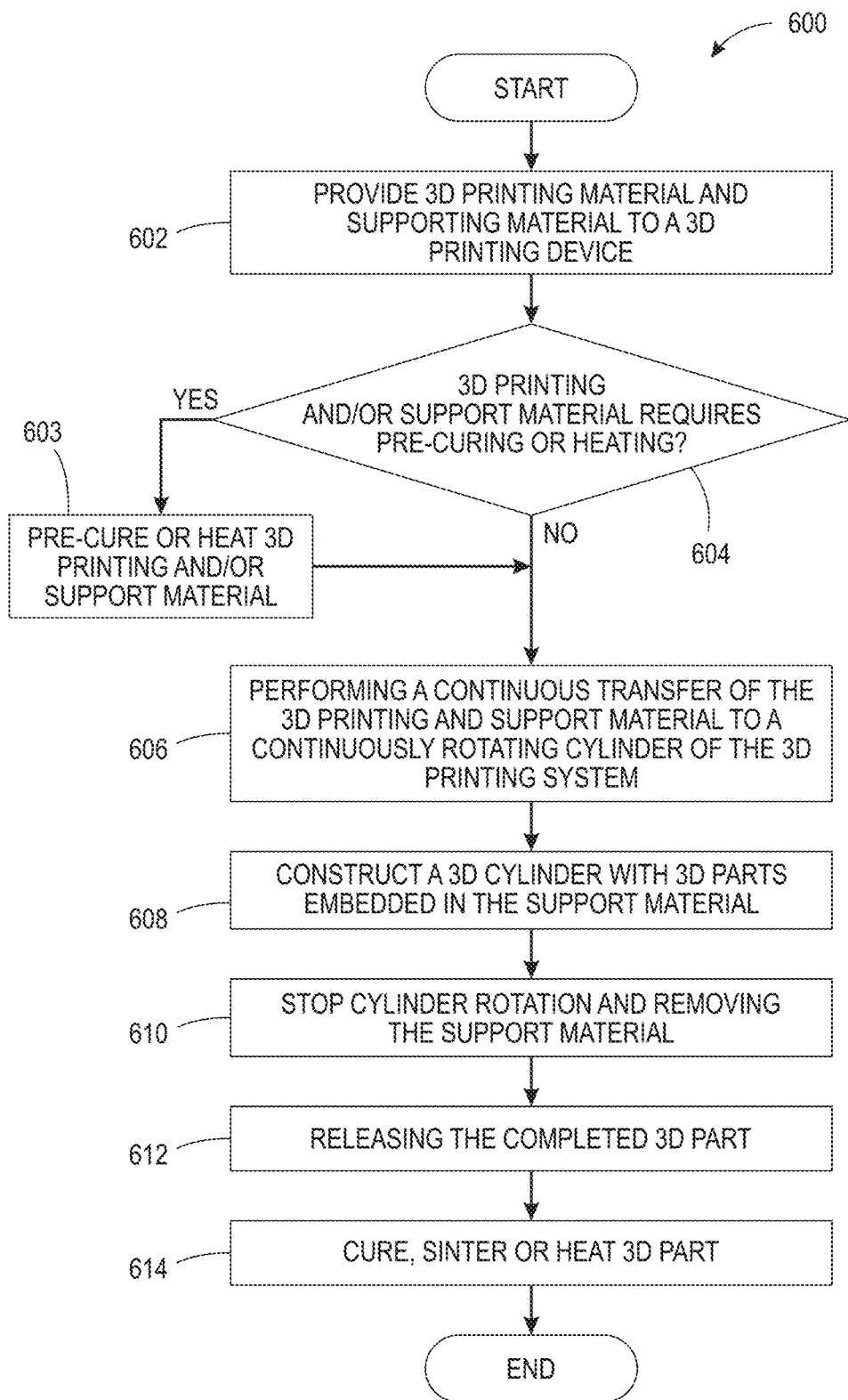
FIG. 6 is a flow diagram of an embodiment of a method of providing high-speed 3D printing, in accordance with the present embodiments.

FIG. 6 illustrates a flow diagram of a method 600 for printing a 3D part utilizing an EHTAL 3D printing system in accordance with the present embodiments. The method 600 may be performed by the 3D printing system 100 as discussed above with respect to FIGS. 1A through 1D. The method 600 may begin with providing 3D printing material and supporting material to the printing system 100 (block 602). The method 600 may continue with determining whether the 3D printing material and/or support material requires pre-curing or heating (block 604). If one or more of the 3D printing material and support material should be pre-cured or heated, the method 600 may pre-cure or heat one or more of the 3D printing material and support material (block 604). The method 600 may then continue with performing a continuous transfer of the 3D printing material and the support material in an appropriately patterned fashion on to the surface of a continuously rotating cylinder of the 3D printing system (block 606). The method 600 may then continue with constructing a 3D cylinder with 3D parts embedded in the support material (block 608). The method 600 may then stop the rotation of the cylinder and continue with removing the support material (block 610). The method 600 may then release a completed 3D part (block 612). The method 600 may optionally cure, sinter, or heat the 3D part (block 614). In different embodiments, the method 600 may cure, sinter, or heat the 3D part between blocks 608 and 610, or between blocks 610 and 612. Moreover, in some embodiments, the '3D printing material' and the 'support material' may be identical, with the geometrical boundary between the 3D printed parts and the supporting structures defined by the patterned deposition of appropriate de-binding or anti-sintering agents. In this way, the 3D printed parts may be thus constructed to extend outwardly layer by layer in a continuous manner the diameter of a continuously rotating outwardly growing cylinder without having to resort to the discontinuous, stop-and-go/back-and-forth motion associated with sequential layer by layer deposition approaches that are utilized in state-of-the-art 3DP/AM systems, thereby reducing process time and significantly improving fabrication productivity as well as avoiding flat planes of layered structures within the 3DP/AM parts that may be prone to mechanical failure.

Figure 7:
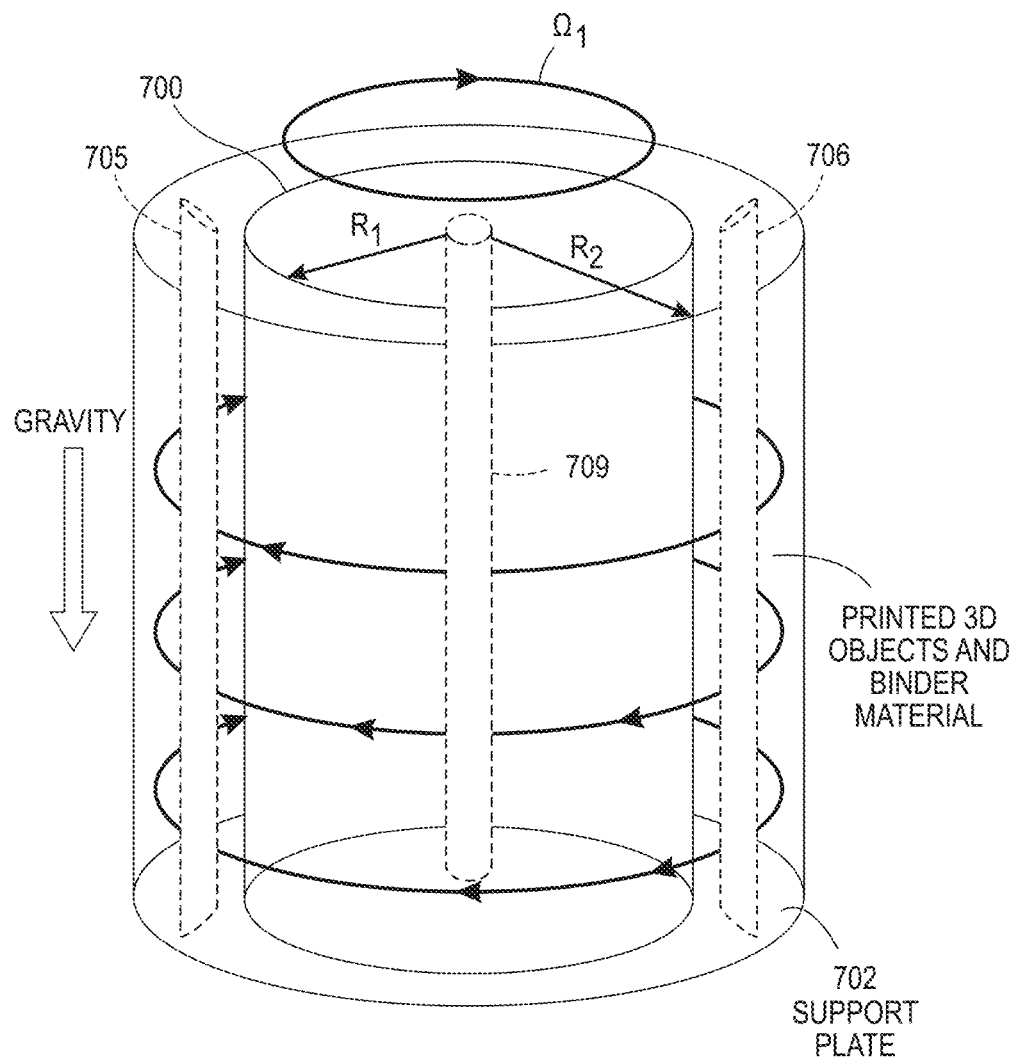
FIG. 7 is a diagram of an embodiment of a cylinder with a vertical orientation of the axis of rotation, in accordance with one embodiment of the present disclosure.

FIG. 7 illustrates an embodiment comprising of a cylinder 700 with a vertical orientation of the axis of rotation (i.e., rotational axis oriented in a direction parallel to the direction of gravity) in accordance with the present embodiments. For example, in some instances, a vertical orientation of the rotational axis of the cylinder 700 may be provided by orienting the cylinder 700, such that the axis of rotation is in the same direction as gravity. The bottom of the cylinder 700 may be supported by a rotating support plate 702 (e.g., a rigid disc base at the bottom to support weight of the outwardly growing cylinder 700). This way, the entire structure (e.g., cylinder 700, support plate 702, and 3D printed parts) may be supported in the vertical direction as material is continuously added in a spiral, concentric fashion on the outer curved surface of cylinder 700—with the material addition occurring such that the deposition occurs along the entire length, on the outer curved surface of the outwardly growing continuously rotating cylinder. In this arrangement, the distribution of weight is symmetrical relative to the axis of rotation as the materials are built up and the materials being deposited may additionally be supported using a support plate 702, thus making it easier to prevent shape distortions due to uneven weight loads during parts fabrication.

As illustrated in FIG. 7, a subsystem 706 and a subsystem 705 may be used to grow, extend, build, fabricate, grow outwardly, etc., the cylinder 700. In one embodiment, the subsystem 705 may deposit, apply, spray, shoot, etc., an active material onto the outer surface of cylinder 700 and the subsystem 706 may deposit, apply, spray, shoot, etc., a support material onto the outer surface of cylinder 700, as discussed above. In another embodiment, subsystem 705 may deposit, apply, spray, shoot, etc., an active 3D printing material onto the outer curved surface of outwardly growing continuously rotating cylinder 700 and the subsystem 706 may deposit, apply, spray, shoot, etc., an anti-sintering agent (e.g., anti-binding agent) onto the outer curved surface of outwardly growing continuously rotating cylinder 700, as discussed above. In other embodiments, one or more of the subsystems 705 and 706 may be movable in a horizontal direction. For example, one or more of the subsystems 705 and 706 may be movable left or right, parallel to the rotational axis of the cylinder 700. The cylinder 700 includes a starting core 709 (e.g., a starting core, a central core, a starting central core, etc.) which provides an initial surface where the active material may be deposited. The core 709 may be attached to a rotating system (e.g., a rotating support axle, a motor that rotates the core 709, etc.). Moreover, the rotational speed of the cylinder 700 (e.g., number of revolutions per minute or RPM) may be continuously adjusted to maintain a fixed linear speed of the outer surface in order to maintain optimal deposition conditions for subsystems 705 and 706, or the deposition speed of deposition systems 705 and 706 may be continuously adjusted as the diameter of cylinder 700 grows outward.

The rotation system for rotating the cylinder 700, subsystems 705 and 705, etc., may all be controlled by a control system/subsystem. For example, a computing device may synchronize the operation of the rotation system, subsystems 705 and 705, etc.

Various operations are described as multiple discrete operations, in turn, in a manner that is most helpful in understanding the present disclosure, however, the order of description may not be construed to imply that these operations are necessarily order dependent. In particular, these operations need not be performed in the order of presentation.

The preceding description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular embodiments may vary from these exemplary details and still be contemplated to be within the scope of the present disclosure.

Additionally, some embodiments may be practiced in computing environments where the machine-readable medium is stored on and or executed by more than one computer system. For example, a computing device may execute instructions stored on the machine-readable medium and may be executed by a control system to operate the 3D printing systems described herein (e.g., to control a rotation system/subsystem, to control a deposition system/subsystem, to control rollers, belts, to synchronize the operation of the rotation system/subsystem with the deposition system/subsystem, etc.). In addition, the information transferred between computer systems may either be pulled or pushed across the communication medium connecting the computer systems.

Embodiments of the claimed subject matter include, but are not limited to, various operations described herein. These operations may be performed by hardware components, software, firmware, or a combination thereof. Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent or alternating manner.

The above description of illustrated implementations of the disclosure, including what is described in the Abstract, is not intended to be exhaustive or to limit the disclosure to the precise forms disclosed. While specific implementations of, and examples for, the disclosure are described herein for illustrative purposes, various equivalent modifications are possible within the scope of the disclosure, as those skilled in the relevant art will recognize. The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion.

As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first,"

"second," "third," "fourth," etc. as used herein are meant as labels to distinguish among different elements and may not necessarily have an ordinal meaning according to their numerical designation.

It will be appreciated that variants of the above-disclosed and other features and functions, or alternatives thereof, may be combined into may other different systems or applications. Various presently unforeseen or unanticipated alternatives, modifications, variations, or improvements therein may be subsequently made by those skilled in the art which are also intended to be encompassed by the following claims. The claims may encompass embodiments in hardware, software, or a combination thereof.

What is claimed is:

1. A printing system for producing at least one three dimensional (3D) printed part, comprising:
    a deposition system configured to continuously deposit a layer onto a cylinder to outwardly extend a diameter of the cylinder, wherein the layer comprises a first pattern corresponding to an active printing material and a second pattern corresponding to a support material;
    a rotating system configured to rotate the cylinder; and
    a control system configured to synchronize the deposition system with the cylinder.

2. The printing system of claim 1, wherein the deposition system comprises a first subsystem configured to move radially with respect to the cylinder to continuously deposit a first portion of the layer on a curved outer surface of the rotating cylinder.

3. The printing system of claim 2, wherein the deposition system comprises a second subsystem configured to move radially with respect to the diameter of the cylinder to deposit a second portion of the layer on the curved outer surface of the rotating cylinder.

4. The printing system of claim 3, wherein the first portion comprises a first material and wherein the second portion comprises a second material.

5. The printing system of claim 4, wherein the rotating system comprises a support plate, wherein an axis of rotation of the cylinder is perpendicular to the support plate and the axis is oriented parallel to the direction of gravity.

6. The printing system of claim 1, wherein the deposition system uses a jetting process to continuously deposit the first pattern onto the cylinder and wherein the jetting process is performed using one or more of a piezoelectric based print-head, a thermal based print-head, and an aerosol spray head.

7. The printing system of claim 1, wherein the deposition system comprises a first subsystem configured to continuously deposit the active material to be 3D printed and a second subsystem configured to continuously deposit the support material.

8. The printing system of claim 1, wherein the deposition system comprises a first subsystem configured to a continuously deposit the active material to be 3D printed.

9. The printing system of claim 1, further comprising a sintering subsystem that includes a heating element.

10. The printing system of claim 1, wherein the printing system is configured to generate concentrically cylindrical and spiral layers based on a target construction of the at least one 3D printed part.

11. The printing system of claim 1, wherein the first pattern is defined via an optical device.

12. The printing system of claim 1, wherein the first pattern defines one or more cut-lines to enable removal of a plurality of parts including the at least one 3D printed part from the cylinder.

13. The printing system of claim 1, wherein wherein the second pattern does not correspond to a cross-section of the at least one 3D printed part.

14. The printing system of claim 1, wherein the deposition system comprises an intermediate transfer belt and wherein an axis of rotation of the rotating cylinder is dynamically positioned to maintain the transfer of the layer between the intermediate transfer belt and an outer curved surface of the rotating cylinder.

15. The printing system of claim 1, wherein the deposition system comprises a plurality of subsystems, wherein the layer comprises multiple patterns, and wherein the plurality of subsystems is configured to:
    deposit multiple portions of the layer on the curved outer surface of the rotating cylinder as a diameter of the rotating cylinder grows outward, based on the multiple patterns, wherein at least one portion of the multiple portions comprises a different material than at least one other portion of the multiple portions.

16. A printing system for producing at least one three dimensional (3D) printed part, comprising:
    a deposition system configured to continuously deposit a layer onto a cylinder to outwardly extend a diameter of the cylinder, wherein the layer comprises a first pattern corresponding to an active printing material and a second pattern corresponding to a support material, wherein the first pattern is defined via an optical device, and wherein the first pattern is defined in the continuously deposited layer by the optical device;
    a rotating system configured to rotate the cylinder; and
    a control system configured to synchronize the deposition system with the cylinder.

17. The printing system of claim 16, wherein the optical device defines the first pattern by projecting patterned light of wavelength between 200 nanometers to 10 micrometers onto the continuously deposited layer.

18. The printing system of claim 16, wherein the optical device defines the first pattern through an oxygen permeable membrane.

19. The printing system of claim 16, further comprising:
    depositing a second material on the active printing material to define the first pattern, wherein the second material comprises at least one of: an anti-sintering agent, or a de-binding agent.

20. A printing system for producing at least one three dimensional (3D) printed part, comprising:
    a deposition system configured to continuously deposit a layer onto a cylinder to outwardly extend a diameter of the cylinder, wherein the layer comprises a first pattern corresponding to an active printing material and a second pattern corresponding to a support material, wherein the deposition system comprises a first subsystem configured to a continuously deposit the active material to be 3D printed and a second subsystem configured to continuously deposit at least one of an anti-sintering material or a de-binding agent;
    a rotating system configured to rotate the cylinder; and
    a control system configured to synchronize the deposition system with the cylinder.

* * * * *